July 7, 1925.
W. M. EDDINS
SLAB KICKER
Filed Sept. 22, 1924
1,545,409
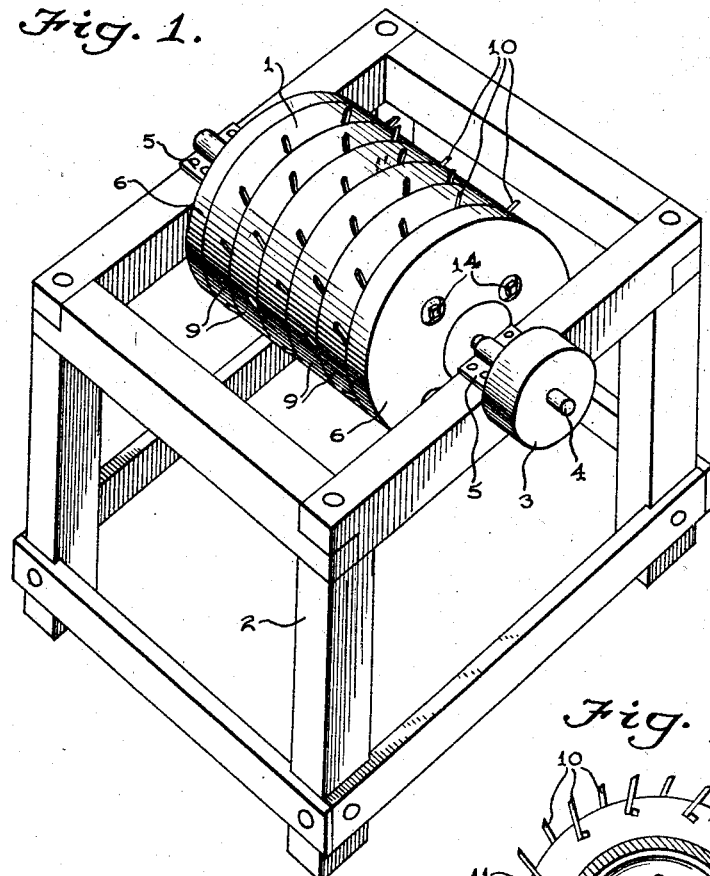
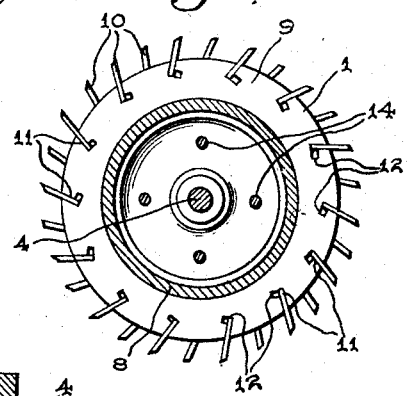
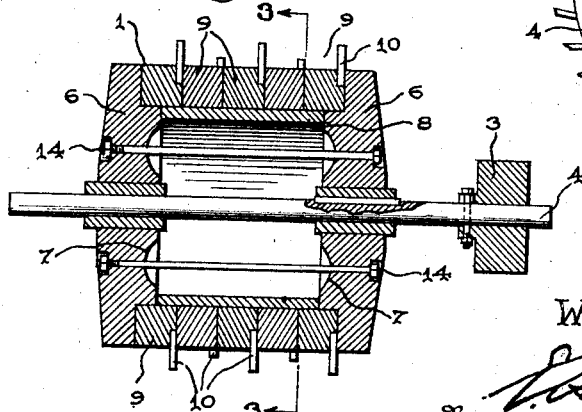
Inventor
Web M. Eddins
By
Attorney Patented July 7, 1925.

1,545,409

UNITED STATES PATENT OFFICE.

WEB M. EDDINS, OF BARNETT, MISSISSIPPI.

SLAB KICKER.

Application filed September 22, 1924. Serial No. 739,142.

*To all whom it may concern:*

Be it known that WEB M. EDDINS, a citizen of the United States of America, residing at Barnett, in the county of Clarke and State of Mississippi, has invented new and useful Improvements in Slab Kickers, of which the following is a specfication.

The object of the invention is to provide a device for use in connection with saw mills, particularly those of small capacity, whereby slabs or short pieces of lumber unfit for stock may be thrown a material distance away from the saw for disposition by burning or otherwise, as may be desired.

A further object is to so construct the kicker that it may be cheaply made and that it may be readily reequipped with new teeth when necessary.

With these objects in view, the invention consists in a construction and combination of parts of which a preferred embodiment is illustrated in the accompanying drawings, wherein:

Figure 1 is a perspective view of the invention.

Figure 2 is a central longitudinal sectional view through the drum.

Figure 3 is a transverse sectional view on the line 3—3 of Figure 2.

Designed to be placed adjacent to the usual cut-off saw and actuated by the line shaft by which the saw is driven, the invention consists of a peripheral toothed drum 1 rotatably mounted on an appropriate framework 2 and driven by a belt trained over the pulley 3 carried at one end of the shaft 4 journaled in appropriate bearings 5. The drum consists of the two end plates 6 recessed on their inner faces as shown at 7 to properly or centrally position the hollow core 8, in surrounding relation to which are disposed the rings 9.

Teeth 10 are detachably mounted in the rings 9, the latter being provided with lateral recesses 11 disposed at a slight angle to the radius of the rings and terminating in recessed extensions 12 disposed in positions approaching the tangential. The recesses are of angular formation and the teeth are correspondingly formed where they penetrate the drum, so that the extensions provide means for retaining the teeth in the rings against the centrifugal force tending to throw them out.

The recesses 11 are disposed at an angle to give the teeth the proper pitch and when the rings are assembled on the core and interposed between the two end plates which are detachably connected by bolts 14, the drum is assembled into a unitary structure. When rotated by means of the pulley, slabs or small pieces of lumber may be cast onto the periphery and they may be engaged by the teeth and thus catapulted or thrown to a remote distance from the saw, where they may be disposed of by burning or otherwise, as may be desired.

Continued use of the device results in dulling, damaging or bending the teeth and whenever it is desired to replace a damaged tooth, the two end plates may be disconnected by the removal of the bolts, thus leaving the rings free to be shifted to obtain access to the slots therein, when the old tooth may be removed and a new tooth inserted. The slots being on the sides of the rings, one ring abutting the other, serve to prevent lateral displacement of the teeth.

The invention having been described, what is claimed as new and useful is:

1. A device for the purpose indicated comprising a drum consisting of end plates and securing bolts connecting the same, a hollow cylindrical core interposed between the plates and in surrounding relation to said bolts, and toothed rings in surrounding relation to the core and clamped into lateral engagement by said plates.

2. A device for the purpose indicated comprising a drum consisting of end plates and axial bolts securing the same, a hollow core in surrounding relation to said bolts and interposed between said plates, rings in surrounding relation to the core and clamped into lateral contact by said plates, each of said rings on one side being provided with slots, and teeth mounted in said slots and retained therein by the lateral engagement of the rings.

3. A device for the purpose indicated comprising a drum consisting of end plates and axial bolts securing the same, a hollow core in surrounding relation to said bolts and interposed between said plates, rings in surrounding relation to the core and clamped into lateral contact by said plates, each of said rings on one side being provided with slots, and teeth mounted in said slots and retained therein by the lateral engagement of the rings, the slots being of angular formation and the teeth on those portions engaged in the slots corresponding to the latter.

In testimony whereof he affixes his signature.

WEB M. EDDINS.